(12) United States Patent
Zaus

(10) Patent No.: US 8,326,308 B2
(45) Date of Patent: Dec. 4, 2012

(54) MOBILE CELLULAR NETWORK AND METHOD FOR OPERATING MOBILE CELLULAR NETWORK

(75) Inventor: Robert Zaus, München (DE)

(73) Assignee: Siemens Aktiengesellschaft, Munich (DE)

( * ) Notice: Subject to any disclaimer, the term of this patent is extended or adjusted under 35 U.S.C. 154(b) by 1047 days.

(21) Appl. No.: 11/990,639

(22) PCT Filed: Aug. 14, 2006

(86) PCT No.: PCT/EP2006/065290
§ 371 (c)(1),
(2), (4) Date: Feb. 19, 2008

(87) PCT Pub. No.: WO2007/020254
PCT Pub. Date: Feb. 22, 2007

(65) Prior Publication Data
US 2009/0042600 A1    Feb. 12, 2009

(30) Foreign Application Priority Data

Aug. 19, 2005   (DE) .................. 10 2005 039 363
Oct. 24, 2005   (DE) .................. 10 2005 050 852

(51) Int. Cl.
*H04W 72/00* (2009.01)
(52) U.S. Cl. .............. 455/452.1; 455/450; 455/439; 455/435.1
(58) Field of Classification Search .......... 455/439, 455/452.2, 450–454, 435.1–435.3
See application file for complete search history.

(56) References Cited

U.S. PATENT DOCUMENTS

2005/0064821 A1 * 3/2005 Hedberg et al. ............ 455/67.11

FOREIGN PATENT DOCUMENTS

WO    01/41372 A2    6/2001
WO    2005/029903 A1    3/2005

OTHER PUBLICATIONS

International Search Report for Application No. PCT/EP2006/065290; mailed Mar. 5, 2007.
"UDI/RDI fallback and service modification; Stage 2", Universal Mobile Telecommunications System (UMTS), Technical realilzation of Circuit Switched (CS) multimedia service, ETSI TS 123.172, Version 6.3.0, Release 6, Jun. 2005, pp. 1-57.
"UDI/RDI fallback and service modification; Stage 2 (Release 5)", Technical realilzation of Circuit Switched (CS) multimedia service, 3rd Generation Partnership Project, Technical Specification Group Core Network, 3GPP TS 23.172 V5.0.0, Jun. 2002, pp. 1-17.
English translation of Chinese Office Action issued Oct. 18, 2010 in corresponding Chinese Patent Application 200680030237.8.

(Continued)

*Primary Examiner* — Steven Lim
(74) *Attorney, Agent, or Firm* — Staas & Halsey LLP

(57) ABSTRACT

A mobile radiotelephone network, e.g., operated according to the GSM-or 3GPP-standard, provides several services which have different requirements on network resources. The automated setting up of a connection in the second service is provided in reaction to a desired connection set-up between one of the end devices in the first service, according to predetermined conditions.

11 Claims, 2 Drawing Sheets

OTHER PUBLICATIONS

"Universal Mobile Telecommunications System (UMTS); Technical realization of Circuit Switched (CS) multimedia service; UDI/RDI fallback and service modification; Stage 2 (3GPP TS 23.172 version 6.3.0 Release 6)", ETSI TS 123 172 V6.3.0; Jun. 2005; pp. 1-57.

Universal Mobile Telecommunications System (UMTS); Technical realization of Circuit Switched (CS) multimedia service; UDI/RDI fallback and service modification; Stage 2; 3GPP TS. 23.172 V.6.3.0. Release 6; ETSI TS 123 172 V6.3.0; 2005; pp. 1-57.

\* cited by examiner

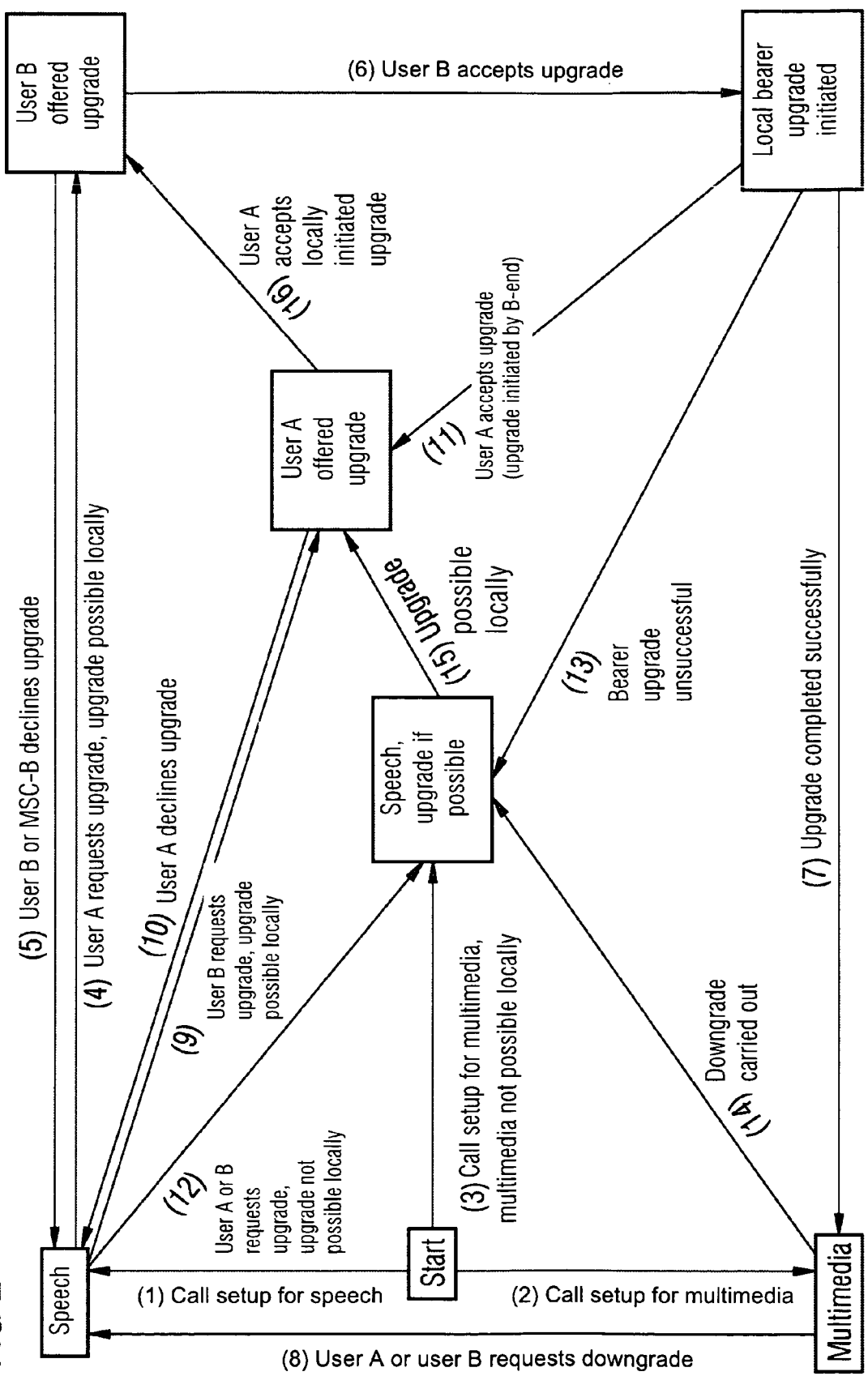

MOBILE CELLULAR NETWORK AND METHOD FOR OPERATING MOBILE CELLULAR NETWORK

CROSS REFERENCE TO RELATED APPLICATIONS

This application is based on and hereby claims priority to German Application No. 10 2005 039 363.2 filed on Aug. 19, 2005 and German Application No. 10 2005 050 852.9 filed on Oct. 24, 2005, the contents of both of which are hereby incorporated by reference.

BACKGROUND

Linking voice and multimedia communication is playing a major role in the evolution and wider and more universal use of mobile cellular networks. While in the early years of mobile communications, speech calls were used independently of and uncorrelated with the then already existing possibility of exchanging short messages (SMS), users nowadays are increasingly interested in the possibility of rapidly switching between speech and text communication. There is even greater interest in so-called multimedia calls in which images or video sequences can be simultaneously presented to the respective party.

In the 3rd Generation Partnership Project (3GPP) mobile standard, a special service "Multimedia Service (UDI/RDI) with Fallback to Speech and Service Modification" has been described since Release 5 in the TS 23.172 specification. This service allows the mobile user to signal to the network at call setup that he or she would like to have the possibility of switching between the two services "speech" and "multimedia" (videotelephony) during the call.

Possible applications of this service include:
a) The user wishes to set up a speech call initially, but to have the option of subsequently switching to multimedia during the call in order to show something to the other party, it also being possible for the switchover to multimedia to be initiated by the other party. If one of the users so wishes, he or she can then switch back from multimedia to speech.
b) The user wishes to set up a multimedia call. If the network or the called user's mobile phone does not support a multimedia call or the called user only wishes to have a speech call instead of a multimedia call, by the signaling described in the TS 23.172 standard a speech call is set up instead of the multimedia call.
c) The user wishes to set up a multimedia call. If during the call the network cannot maintain the multimedia call, the network shall not allow the connection to be severed, but switch over in good time to a speech call (see TS 23.172, Section 4.2.5). This situation may arise, for example,
if the radio link becomes too poor for a multimedia call requiring a 64 kbit/s UDI radio bearer, but the transmission quality is still adequate for a 12.2 kbit/s radio bearer for speech (UDI=unrestricted digital information),
or if a handover takes place to another cell in which, because of a high traffic load, insufficient bandwidth is available for a 64 kbit/s UDI radio bearer,
or if a handover from one radio access network (UTRAN) to another (GERAN) takes place and the new radio access network does not generally support the multimedia call (see FIG. 1).

According to TS 23.172, Section 4.2.5, in case c) the mobile switching center MSC that has initiated the changeover from multimedia to speech should offer the user a change back to multimedia if it subsequently determines during the conversation that a multimedia call would again be possible. The signaling for this purpose is described in TS 23.172.

In the standard, the network-initiated service change is currently only considered for case c). It would be desirable, however, for the network to offer the users a change to multimedia also in case b) if the multimedia call has not materialized only because no multimedia call was possible at one end or the other for network-internal reasons at the time of call setup (e.g. because one of the two users was located in a global system for mobile communications (GSM) cell at the time of call setup).

The standard also describes what should happen if, although the multimedia call is again possible at one end after a certain time, e.g. after the user has moved from a GSM to a UMTS cell, a multimedia call is now no longer possible at the other end of the connection, e.g. after the other user has moved from a UMTS to a GSM cell. (See FIG. 1: user A with mobile terminal MSA changes back from GERAN (2) to UTRAN (1), but user B with mobile terminal MSB has now changed from UTRAN (3) to GERAN (4); cf. also the description of the figures below.)

More generally, the problem is as follows: one of the two users would like to use a service 1 which, however, is only available in parts of the network or cannot be offered at all times because of a lack of certain resources. If the higher-grade service 1 cannot be provided by the network and the network instead sets up a connection for a service 2 or, if the connection for service 2 has already been set up, declines the service change from service 2 to service 1, the user request for service 1 should be stored in the network.

As soon as service 1 is available again in the network (e.g. because one of the users has moved to another radio cell), the change to service 1 should be offered to both users.

The user request should where possible be deleted from the network when the connection between the users is cleared down or if one of the two users does not accept the service change to service 1 proposed by the network (either by explicitly declining the change or by not responding to the offer and a monitoring timer then timing out in the network).

As described above, the standard currently only deals with case c) and even then offers only an incomplete solution for that scenario.

Quotation from TS 23.172, v 6.2.0, Section 4.2.5.2:
"The network initiated service change from speech to multimedia in Iu mode is an optional feature. If supported the MSC initiating the service upgrade to multimedia shall use the following procedure. However a service change from speech to multimedia should not be initiated unless a network initiated service change from multimedia to speech had previously taken place during the same user session. . . . "

However, the information as to whether a network-initiated service change from multimedia to speech had previously taken place is only available locally in the MSC which has implemented the change, as the signaling between the MSCs does not allow the other MSC to be informed why a service change is being requested (user- or network-initiated).

Consequently, the mechanism described by the standard fails if the upgrade to multimedia is possible at a particular point in time in MSC A, but is now no longer possible at the other end of the connection, in MSC B. As the signaling between MSC A and MSC B does not allow MSC A to be informed as to whether the service change from speech to multimedia has been declined by MSC B for network-internal reasons or because the user B did not want to change, MSC A will in this situation again delete the user request for a service change.

SUMMARY

An aspect is an improved method of the generic type which allows a more universal and more flexible use of services with different resource requirements in a mobile cellular network and a correspondingly improved mobile cellular network.

The method incorporates the basic concept of providing, in the mobile cellular network, a distributed control system which can store a call status or call setup request under a service with a predefined resource requirement, monitor the currently available resources and compare them with the resource requirement of that service and, according to the result of the comparison, generate a signal characterizing the (re-)availability of the resource-intensive service. The method also incorporates the concept of transmitting this signal to at least one of the terminals involved in a call and using it there in particular for generating an indication informing the user about the availability of the service in question.

In a procedure it is provided that the stored information representing the call status or call setup request is deleted in response to the expiration of a predefined time period after transmission of the signal characterizing the availability of the first service or in response to a signal characterizing the rejection of the first service by at least one of the two terminals. The option of restoring the call to the higher-grade (first) service is therefore abandoned, and the persistence of (in some cases irritating) indications in this respect on the users' terminals is eliminated.

By distributed control is meant in particular that storage information representing the abandoned call status or call setup request is stored locally in a control unit of the mobile switching center at whose end of the connection it is currently not possible to implement the first service. The term preferably also means that, in response to a comparison result indicating the availability of sufficient resources, the signal characterizing the availability of the first service is signaled by the storing mobile switching center initially to the terminal connected thereto and only in response to a confirmation signal issued by the latter to the second terminal also.

Finally an embodiment of distributed control provides that, in response to a confirmation signal from the second terminal, the carrier of the radio access system for the first service is switched over locally at the storing mobile switching center.

Another advantageous characteristic of the basic concept of distributed control of service switchover is that, in response to a failure to change to the first service on the part of the mobile switching center assigned to the second terminal, the storage information representing the abandoned call status or call setup request is deleted in the first mobile switching center and stored instead in the second mobile switching center.

In another, relatively independent expression of the method is that, during an existing connection between the two terminals, under predetermined conditions automatic switching from the first service with higher resource requirement to the second service with lower resource requirement takes place and the mobile switching center which has initiated the switchover then automatically behaves as if the user to which it is assigned had signaled a call setup request for the first service.

As advantageous embodiments of a mobile cellular network largely correspond to the abovementioned method aspects, they will not be individually listed again here.

Attention is drawn, however, to the decentralized provision of storage for call status or call setup request and allocated resource requirement of the corresponding service, monitoring for current resource availability and the two assigned comparators at the mobile switching centers MSC.

It should also be noted that preferably dedicated signal or data transmission units are provided between the mobile switching centers for transmitting the signals generated by the decentralized comparators (relating to the re-availability of a higher-grade service) or the stored information relating to the abandoned call status or call setup request. Assigned to these data transmission units, there are provided, in the mobile switching centers, control units for storing the storage information in the receiving mobile switching center, with simultaneous deletion in the transmitting mobile switching center.

Finally it should be noted that, between the MSCs and the respectively assigned terminals, there are provided signal transmission units for the respective comparator unit's output signal representing the re-availability of the higher-value service (in the direction of the terminal) and an input signal representing the user's response (in the direction of the MSC).

The proposed solution not only covers the case that the network has previously initiated a service change from multimedia to speech during a multimedia call, but also the cases in which previously only speech was able to be used during the lifetime of the connection; either because the network has already changed to speech at connection setup, or because one of the two users has signaled the request for multimedia only after the speech call had already been set up.

Distributed control makes changes to the signaling protocol between MSC A and MSC B unnecessary, and the signaling load between the MSCs can be reduced.

That is to say, if the user request were permanently stored at one end, e.g. in MSC A, on the one hand the signaling between the MSCs would have to be extended such that MSC B can if necessary inform MSC A as to why the service change has been declined—by MSC B itself for network-internal reasons or because user B has declined. On the other hand, MSC B would have to notify MSC A each time the possibility of changing to multimedia arises at its end. The information as to whether a change is actually wanted would only be stored in MSC A.

BRIEF DESCRIPTION OF THE DRAWINGS

These and other aspects and advantages will become more apparent and more readily appreciated from the following description of basic exemplary embodiments with reference to the accompanying drawings, in which:

FIG. 1 is a block diagram schematically illustrates an inventive section of a mobile cellular network and FIG. 2 is a state diagram schematically illustrates a corresponding control logic.

DETAILED DESCRIPTION OF THE PREFERRED EMBODIMENT

Figure 1:
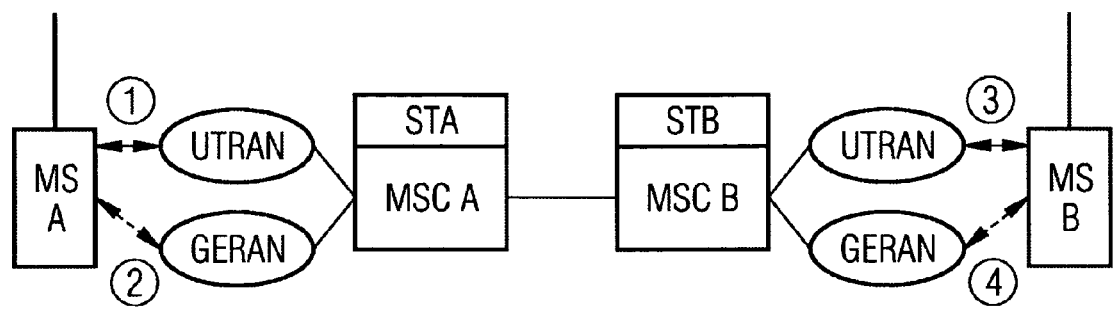

Reference will now be made in detail to the preferred embodiments, examples of which are illustrated in the accompanying drawings, wherein like reference numerals refer to like elements throughout.

As schematically illustrated in FIG. 1, control units STA and STB are located in two mobile switching centers MSC A and MSC B respectively, the control units being able to store the user request for a higher-grade service.

The request for a service change (upgrade) is always stored locally in the control unit which detects that, at its end, e.g. because of radio access network limitations, the change to the higher-grade service 1 is not possible. The control logic is shown in FIG. 2 in the form of a state diagram, taking the example of upgrading from "speech" to "multimedia".

According to the related art, a user can set up a speech call or a multimedia call (transition (1) from "start" state to "speech", or transition (2) from "start" to "multimedia").

If a multimedia call has been successfully set up and one of the two MSCs is subsequently forced to downgrade from multimedia to speech, e.g. because of the deteriorating quality of the radio channel, this is memorized locally by the control logic in that MSC (transition (14) from "multimedia" state to "speech", upgrade if possible").

The control unit in the MSC also remembers that a change to multimedia is requested:
a) if during call setup a multimedia call is requested, but the MSC can only set up a speech call in the radio cell in which the mobile user controlled by the MSC is located (transition (3) from "start" state to "speech, upgrade if possible");
b) if a connection for speech is already set up and one of the two users signals that he or she would like to upgrade to multimedia, but the change is not possible locally in the radio cell in which the mobile user controlled by the MSC is located (transition (12) from "speech" state to "speech, upgrade if possible"); and
c) if the local radio access network is temporarily unable to assign the desired radio bearer e.g. because of a high traffic load in the cell (transition (13) from "local bearer upgrade initiated" to "speech, upgrade if possible").

In per se known manner the service change is later initially offered locally by MSC A to user A (calling party) if, in the state "speech, upgrade if possible", a change to multimedia becomes locally possible (15), e.g. after a handover of user A from a GSM to a UMTS cell or if the radio access network reports that the traffic load in the cell has reduced so greatly that the desired radio bearer can be assigned.

If user A declines, the user request is deleted in the control unit (10). If user A accepts (16), the change is signaled to MSC B. If the change is accepted at the B-end (6), the radio access bearer is also switched over locally so that the connection can be used for multimedia (7). Should an error occur here, e.g. because the traffic load in the cell is too high, the network falls back to the old configuration for speech, and memorizes the user request for multimedia (13).

If the service change fails at the B-end for any reason (5), the user request is deleted in the control unit of MSC A. In this case the control unit in MSC B knows whether the change to multimedia has been declined by user B (called party) or by MSC B itself for network-initiated reasons.

In the first case, the control unit in MSC B remains in the "speech" state, or changes thereto if it was previously in another state, e.g. "speech, upgrade if possible". In the second case, if the change has been declined by MSC B, the control unit changes to the state "speech, upgrade if possible", i.e. the user request for a service change remains stored in the network. However, the location where it is stored has now changed from MSC A to MSC B.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to an embodiment configurations and situation illustrated in the drawings and explained above, but is likewise possible in a large number of variations of same within the scope of competent practice; thus, it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A method for operating a mobile cellular network, in accordance with a global system for mobile communications or 3rd Generation Partnership Project standard, providing services having different network resource requirements and providing automatic connection setup under a second service in response to a connection setup request entered at one of a plurality of terminals in a network under a first service subject to specified conditions, comprising:
   storing the connection setup request internally in the network under the first service;
   monitoring resource availability during a lifetime of an established connection corresponding to the connection setup request and comparing the monitored resource availability with a resource requirement of the first service; and
   transmitting, in response to a comparison result indicating availability of sufficient resources for the first service, a signal characterizing availability of the first service to at least one of the terminals, wherein
   storage information representing the connection setup request is stored locally in a control unit of a first mobile switching center at which side implementation of the first service is currently not possible, and
   the transmitting of the signal characterizing availability of the first service to at least one of the terminals is performed by the first mobile switching center initially to a first terminal connected to the first mobile switching center and subsequently to a second terminal only in response to a confirmation signal output by the first terminal.

2. The method as claimed in claim 1, further comprising deleting storage information representing the connection setup request by at least one of the plurality of terminals in response to expiration of a predefined time period after transmission of the signal characterizing the availability of the first service or in response to a signal characterizing rejection of the first service.

3. The method as claimed in claim 1, further comprising:
   deleting, in response to failure on a side of a second mobile switching center assigned to another terminal to change to the first service, the storage information representing the connection setup request in the first mobile switching center; and
   storing the storage information representing the connection setup request in the second mobile switching center.

4. The method as claimed in claim 1, further comprising, in response to the confirmation signal from the first terminal, switching a carrier of a radio access system for the first service locally at the first mobile switching center.

5. The method as claimed in claim 4, further comprising:
providing, during an existing connection between two terminals, under predetermined conditions, automatic switchover from the first service with higher resource requirement to the second service with lower resource requirement; and
storing, at an initiating mobile switching center which has initiated the automatic switchover, the connection setup request for the first service.

6. The method as claimed in claim 1, wherein the storage information representing the connection setup request is only stored locally in the control unit of the first mobile switching center.

7. A mobile cellular network providing communication between terminals operating in accordance with a global system for mobile communications or 3rd Generation Partnership Project standard, comprising:
means for storing a connection setup request internally in the network under a service;
means for monitoring resource availability during a lifetime of an established connection corresponding to the connection setup request;
means for comparing the monitored resource availability with a resource requirement of the service; and
means for transmitting, in response to a comparison result indicating availability of sufficient resources for the service, a signal characterizing availability of the service to at least one of the terminals, wherein
storage information representing the connection setup request is stored locally in a control unit of a mobile switching center at which side implementation of the service is currently not possible, and
the transmitting of the signal characterizing availability of the first service to at least one of the terminals is performed by the mobile switching center initially to a first terminal connected to the mobile switching center and subsequently to a second terminal only in response to a confirmation signal output by the first terminal.

8. The mobile cellular network as claimed in claim 7, further comprising:
timer means, triggered by transmission of the signal characterizing the availability of the service, for detecting passage of a predefined time period; and
a deletion device, connected in a control-related manner to said timer means, for deleting the storage information representing the connection setup request after said timer means detects expiration of the predefined time period.

9. A mobile cellular network operating in accordance with a global system for mobile communications or 3rd Generation Partnership Project standard, comprising:
mobile switching centers with distributed control systems, each control system including:
storage means for storing a connection setup request for a service with a predefined resource requirement and the predefined resource requirement;
resource monitoring means for monitoring current resource availability at the mobile switching center;
comparator means, connected to said storage means and said resource monitoring means, for comparing the predefined resource requirement with the current resource availability and for outputting a signal characterizing a comparison result; and
transmission means for transmitting the signal characterizing the comparison result to at least one of the terminals initially to a first terminal connected to the respective mobile switching center and subsequently to a second terminal only in response to a confirmation signal output by the first terminal, wherein
storage information representing the call setup request is stored locally in a control unit of the respective mobile switching center at which side implementation of the service is currently not possible.

10. The mobile cellular network as claimed in claim 9, wherein each of said mobile switching centers are assigned
signal or data transmission means for transmitting connection setup request related storage information to another mobile switching center; and
control means for deleting the connection setup request related storage information in said storage means after said transmitting to the other mobile switching center and for storing the storage information in said storage means when received from any other of the mobile switching centers.

11. The mobile cellular network as claimed in claim 10, wherein each of said mobile switching centers are assigned signal transmission means for transmitting the signal output by said comparator means to an assigned terminal and for transmitting a response signal received from and produced at the assigned terminal in response to the signal output by said comparator means.

* * * * *